United States Patent
Chen et al.

(10) Patent No.: US 7,177,131 B2
(45) Date of Patent: Feb. 13, 2007

(54) CONTROL CIRCUIT OF POWER SUPPLY WITH SELECTABLE CURRENT-LIMITING MODES

(75) Inventors: Tsung-Chun Chen, Taipei Hsien (TW); Chih-Fu Fan, Taipei Hsien (TW)

(73) Assignee: Zippy Technology Corp., Taipei Hsien (TW)

( * ) Notice: Subject to any disclaimer, the term of this patent is extended or adjusted under 35 U.S.C. 154(b) by 60 days.

(21) Appl. No.: 11/134,306

(22) Filed: May 23, 2005

(65) Prior Publication Data

US 2006/0125419 A1 Jun. 15, 2006

Related U.S. Application Data

(63) Continuation-in-part of application No. 11/011,057, filed on Dec. 15, 2004.

(51) Int. Cl.
*H02H 9/08* (2006.01)
(52) U.S. Cl. ............... 361/93.9; 361/91.1; 361/18; 315/291; 315/307; 315/127; 363/56.03; 307/35
(58) Field of Classification Search ............. 315/127, 315/291, 307; 361/18, 103, 91.1, 93.9; 363/56.03, 363/56.05; 307/31, 35, 38; 330/298, 209 P
See application file for complete search history.

(56) References Cited

U.S. PATENT DOCUMENTS

| | | | | |
|---|---|---|---|---|
| 5,324,989 | A | * | 6/1994 | Thornton ..................... 307/35 |
| 5,444,590 | A | * | 8/1995 | LeComte et al. ............. 361/18 |
| 6,459,175 | B1 | * | 10/2002 | Potega ....................... 307/149 |
| 7,075,373 | B2 | * | 7/2006 | Briskin et al. .............. 330/298 |

* cited by examiner

*Primary Examiner*—Haissa Philogene
(74) *Attorney, Agent, or Firm*—Birch, Stewart, Kolasch & Birch, LLP

(57) ABSTRACT

The present invention discloses a control circuit of power supply with selectable current-limiting modes, wherein the control circuit which maintains the power-output circuit of the power supply within the energy-limiting standard is performed with automatic detection mode. In the present invention, a current-limiting set unit of the control circuit is coupled to the power-output circuit and provides a current-limiting set value according to power-output levels of the power-output circuit and outputs a current-limiting set signal to a current-limiting switch unit. The current-limiting set unit sets up switch junctions on the power-output levels of the power-output circuit, and the current-limiting switch unit receives the current-limiting set signal to determine the state of the switch junctions in order to provide current-limiting detect values of single set or multiple sets of power-output levels for the current-limiting set unit.

11 Claims, 3 Drawing Sheets

CONTROL CIRCUIT OF POWER SUPPLY WITH SELECTABLE CURRENT-LIMITING MODES

This is a continuation-in-part, and claims priority, of from U.S. patent application Ser. No. 11/011,057 filed on Dec. 15, 2004, entitled "Control circuit of power supply with selectable current-limiting modes".

FIELD OF THE INVENTION

The present invention relates to a control circuit of power supply with selectable current-limiting modes, particularly to a disable/protect circuit, which can automatically detect the power-output circuit of the power supply, wherein the mode of the comparison of power-output levels with respect to the energy-limiting standard can be selected to be a single-set one or a multiple-set one.

BACKGROUND OF THE INVENTION

Generally speaking, as the DC voltages needed by the motherboard and the peripheral devices (such as the floppy disc drive, hard disc drive, optical disc drive, electric fan, etc.) of the computer are variant, the power supply, which provides the DC power for the computer system, has to output at least two different levels of DC power to satisfy the variant voltage demands of various devices in the computer system.

Recently, as the computer's working speed demanded by the user becomes higher and higher, the electric power needed by CPU and the peripheral devices in the computer system grows responsively; therefore, the power supply of the computer system has to provide more power output. Among various computer designs, the power of the output ports may have an energy-limiting level (maximum output power Max VA) in some systems; thus, these output ports need the design of multiple sets of current-limiting compare units to satisfy those users who demand high-grade safety standard. As the computer systems shift rapidly and the power demand of many peripheral devices is higher and higher, the high-grade safety standard mentioned above may not be satisfied. If a power supply has the aforementioned design, the peripheral devices that can be installed to the computer will be limited. Therefore, the power supply needed by the user is one having selectable single set or multiple sets of current-limiting compare functions for the output ports. As shown in FIG. 1, in this prior art, each of select circuits having switch function is electrically coupled to each current-limiting compare unit, which enables the user to determine whether single set or multiple sets of disable/protect functions for current limiting are to be adopted according to the powers needed by the peripheral devices. Most of the abovementioned problems can be solved by this prior art; however, as it is performed via manual operation, the performance thereof still has room for improvement.

SUMMARY OF THE INVENTION

The primary objective of the present invention is to provide a disable/protect circuit, which can perform the comparison of energy-limiting standard via automatic detection mode. In the present invention, a current-limiting set unit of the disable/protect circuit is coupled to the power-output circuit and provides a current-limiting set value according to the power-output levels of the power-output circuit and outputs a current-limiting set signal to a current-limiting switch circuit. The current-limiting set unit sets up switch junctions on the power-output levels of the power-output circuit, and the current-limiting switch unit receives the current-limiting set signal to determine the state of the switch junctions in order to provide current-limiting detect values of single set or multiple sets of power-output levels for the current-limiting set unit.

Another objective of the present invention is to output an alert signal from the current-limiting set unit to an external alarm unit to indicate the heavy-load state of the power-output levels.

DETAILED DESCRIPTION OF THE PREFERRED EMBODIMENTS

The detailed technical contents of the present invention are to be described below in cooperation with the attached drawings.

Figure 1:
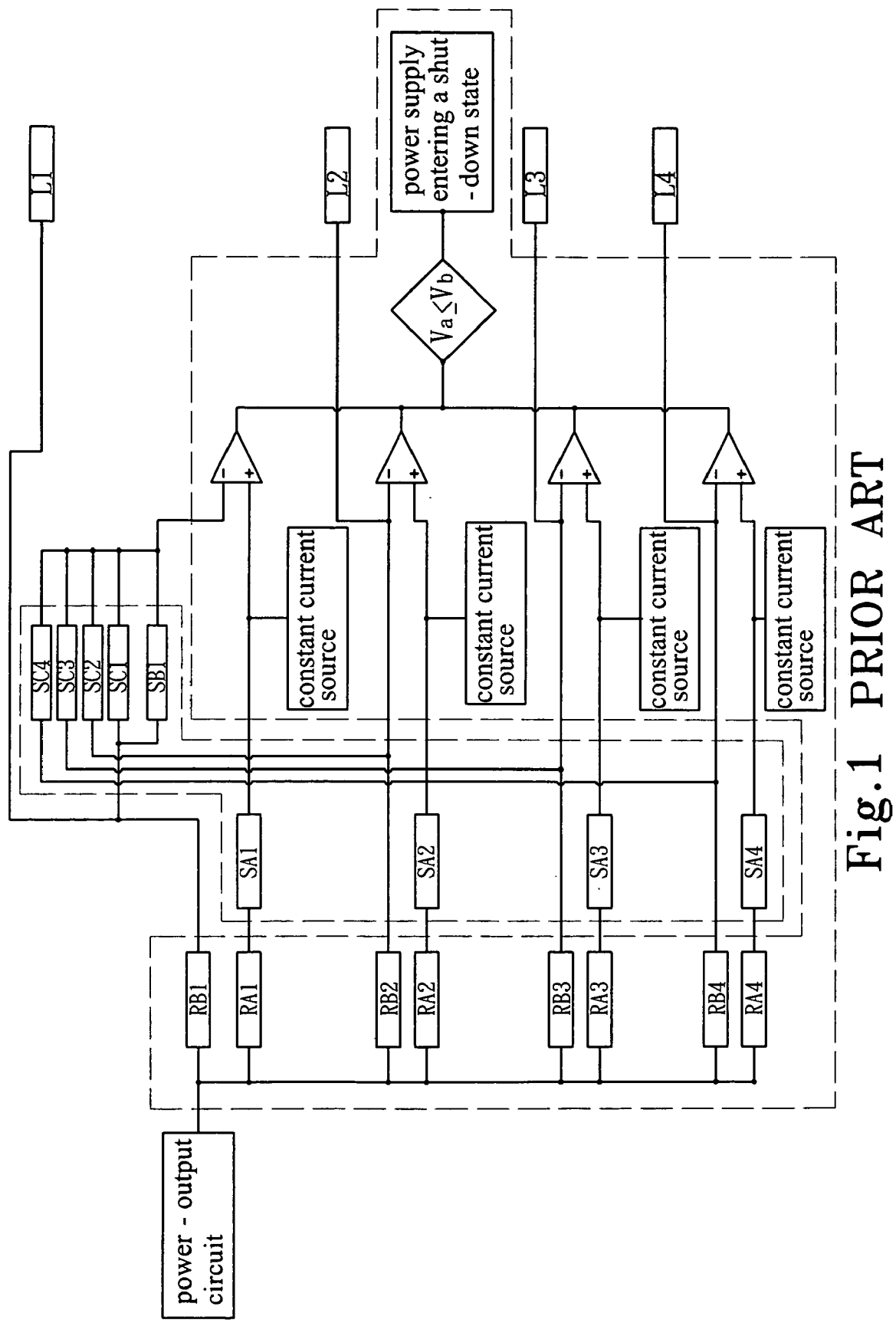
FIG. 1 is a schematic block diagram of a conventional disable/protect circuit.
Figure 2:
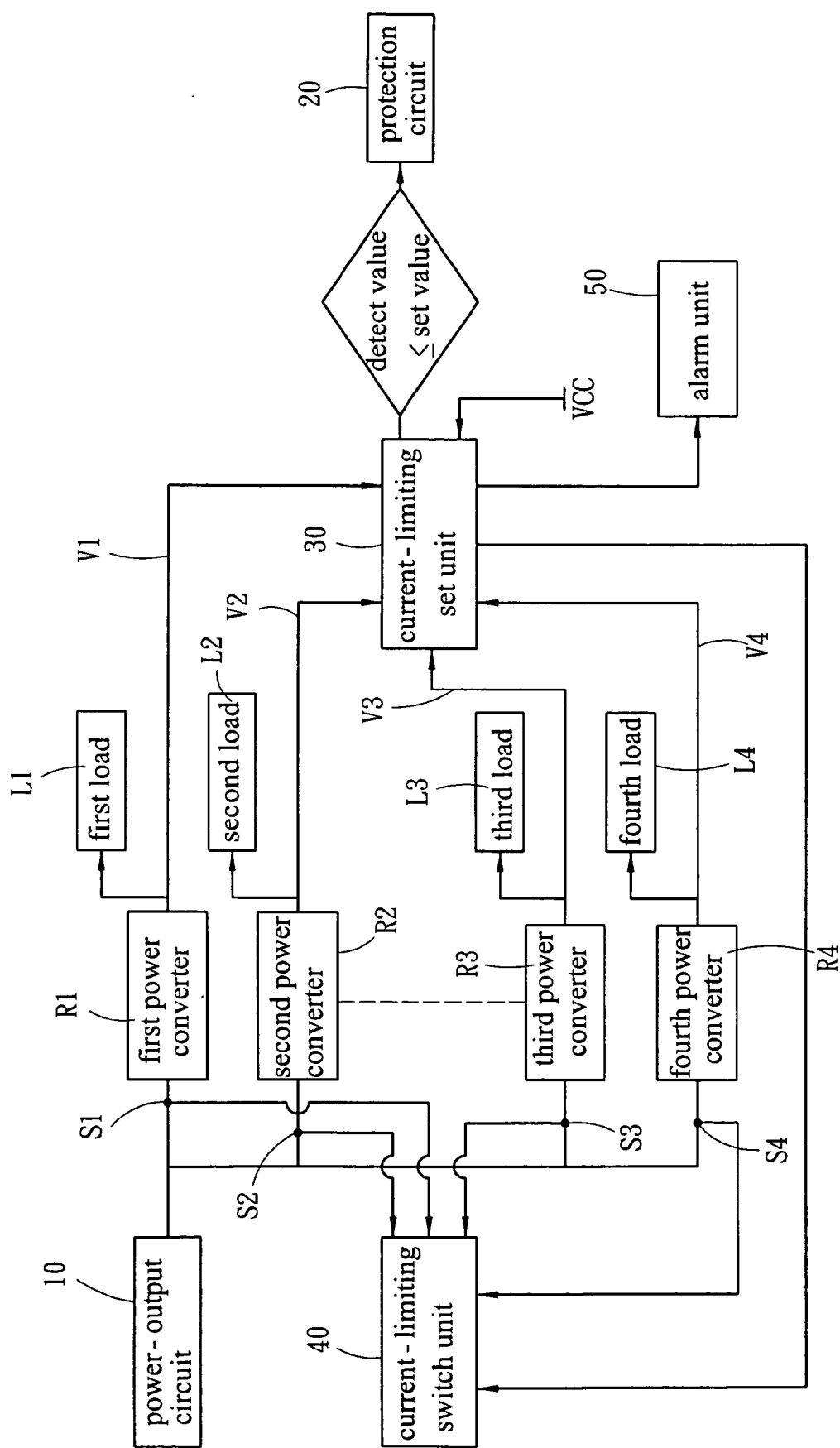
FIG. 2 is a schematic block diagram according to a first embodiment of the present invention.

Refer to FIG. 2, a schematic circuit block diagram according to a first embodiment of the present invention. In the control circuit of power supply with selectable current-limiting modes of the present invention, a power supply utilizes a power-output circuit 10 to provide multiple sets of direct-current power-output levels V1~V4 for single or multiple loads L1~L4. The power supply has a protection circuit 20, which has an overload/disable function (disabling the connection once overload). In the present invention, an overload/disable control circuit is electrically coupled to the power-output circuit 10 and the protection circuit 20; the overload/disable control circuit comprises a current-limiting set unit 30, which can be an integrated circuit and is electrically coupled to the power-output circuit 10 and provides a current-limiting set value and a current-limiting setting signal according to the power-output levels V1~V4 of the power-output circuit 10. The current-limiting set unit 30 obtains a current-limiting detect value from the power-output levels V1~V4 of the power-output circuit 10 to compare with the current-limiting set value in order to determine whether to output a disable/protect signal to the protection circuit 20. In this embodiment, the power-output levels V1~V4 respectively connects power converters R1~R4, which are electric resistances, to obtain voltage drops so that the current-limiting set unit 30 can obtain current-limiting detect values of the power-output levels V1~V4. In the present invention, the current-limiting set unit 30 electrically connects a current-limiting switch unit 40, which can be a transistor or a switch circuit. The current-limiting switch unit 40 sets up switch junctions S1~S4 on the power-output levels V1~V4 of the power-output circuit 10, and the current-limiting switch unit 40 receives the current-limiting set signals to determine the state of the switch junctions S1~S4 single in order to provide current-limiting detect values of single set or multiple sets of power-output levels V1~V4 for the current-limiting set unit 30. Further, the current-limiting set unit 30 can output an alert signal to an external alarm unit 50, which can be a LED indicator or a buzzer, to indicate the heavy-load state of the power-output levels V1~V4.

Figure 3:
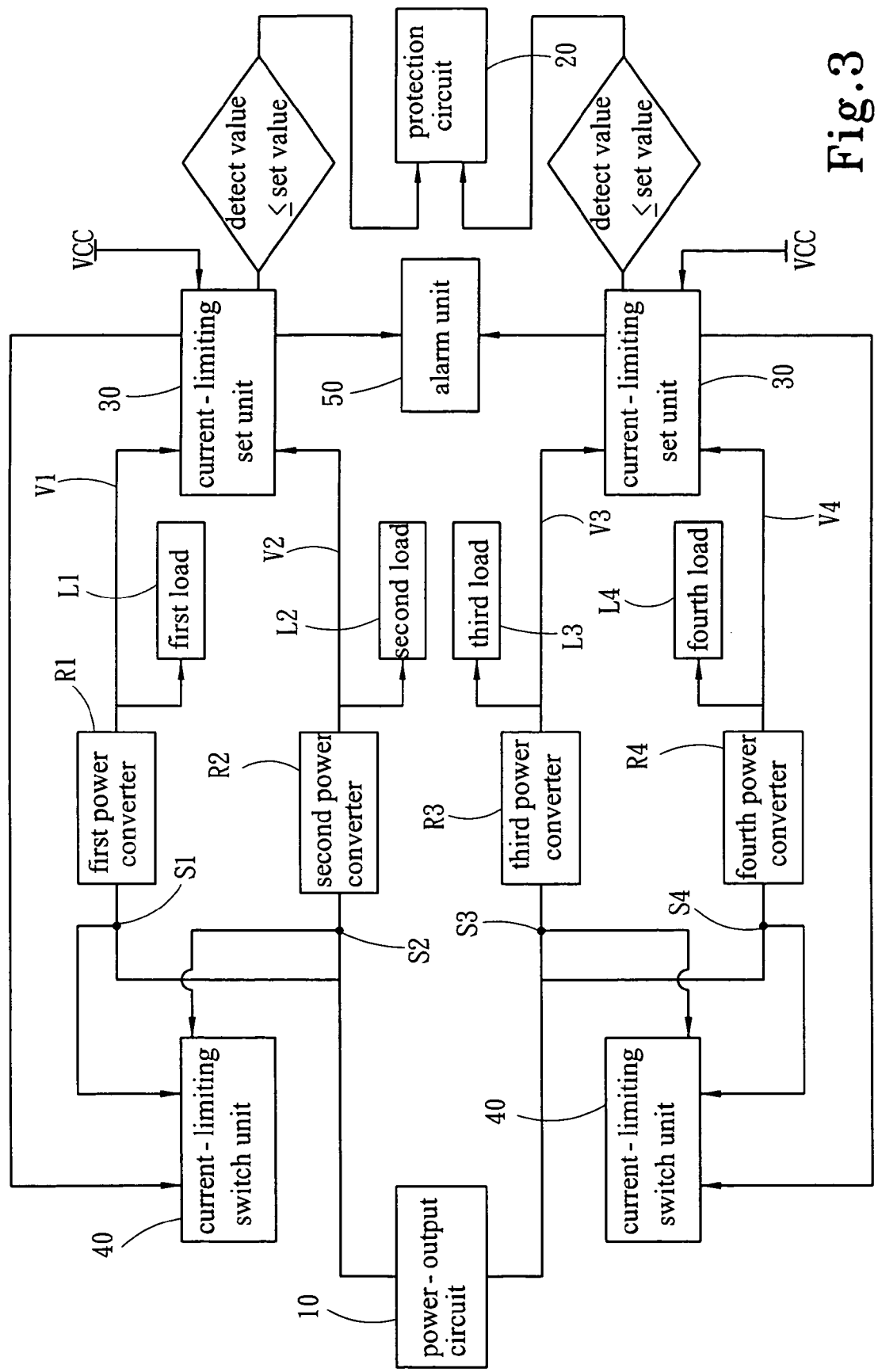
FIG. 3 is a schematic block diagram according to a second embodiment of the present invention.

Refer to FIG. 3, a schematic circuit block diagram according to a second embodiment of the present invention. In comparison with the first embodiment, the second embodiment adopts a design of multiple control circuit. The operation of the second embodiment is similar to the first one and is to be described below.

As automatic control mode is adopted in the present invention, the current-limiting set unit 30 of the control circuit can be beforehand set according to the regions where the product is to be used or the specifications of the machines before delivery in order to provide current-limiting detect values of single set or multiple sets of power-output levels V1~V4 for the current-limiting set unit 30, which can avoid the errors resulting from manual operation. As the current-limiting set unit 30 can be an IC, it can be set, modified, or controlled via software, which enables the distal-end user to control the current-limiting set unit 30 according to the state of the computer.

The embodiment presume that the power-output circuit 10 outputs four sets of direct-current power-output levels V1~V4 of 12V, which drive loads of from a first one L1 to a fourth one L4. The power-output levels V1~V4 respectively have power converters of from a first one R1 to a fourth one R4 of 0.002Ω. Given that the current-limiting energy is 240VAMax and each of the loads of from the first one L1 to the fourth one L4 can tolerate 20A, and in the first setting case that the state of the current-limiting set unit 30 is in single-set current-limiting mode, the current-limiting switch unit 40 is completely in open-circuit state, and each of the power converters of from the first one R1 to the fourth one R4 performs voltage-drop actions respectively. When the current of each of the loads of from the first one L1 to the fourth one L4 exceeds 20A owing to abnormal operation, the current-limiting detect value will be lower than 11.96V, wherein the current-limiting set value is calculated as: 12V−20A*0.002Ω=11.96V according to the voltage-drop way. Then, the current-limiting set unit 30 will output a disable/protect signal to the protection circuit 20, and the protection circuit 20 will determine whether to stop power output. It is to be noted that a momentary or slight overload in the loads of from the first one L1 to the fourth one L4 may occur owing to ambient temperature, flurry of input power, etc. As the present invention adopts the automatic detect mode via IC, the current-limiting set value of the current-limiting set unit 30 can be defined to have an estimated tolerance, such as 105%~120% of the calculated current-limiting set value mentioned above, which enables the momentary or slight overload not to instantly initiate the protection action, and thus, the present invention will be more flexible in performance.

In the second setting case that the state of the current-limiting set unit 30 is in multiple-set current-limiting mode, the current-limiting switch unit 40 is completely in close-circuit state, and the power converters of from the first one R1 to the fourth one R4 are integrated to perform voltage-drop actions. Given that the operational currents in the loads of from the first one L1 to the fourth one L4 are 25A, 18A, 12A, and 21A respectively, as the power converters of from the first one R1 to the fourth one R4 are integrated to perform voltage-drop actions, the current-limiting detect value obtained by the current-limiting set unit 30 is calculated as: 12V−[(25A+18A+12A+21A)*0.002Ω]/4=11.962V. In this case, the currents in the first load L1 and the fourth load L4 exceed the original set value for single set; however, as the power converters of from the first one R1 to the fourth one R4 are integrated to perform voltage-drop actions, the protection circuit 20 of the power supply will not be initiated. Nevertheless, the current-limiting set unit 30 can output an alert signal to the external alarm unit 50, which can be a LED indicator or a buzzer, to indicate that the heavy-load state of the first load L1 and the fourth load L4. Similar to the first setting case, the current-limiting set value of the current-limiting set unit 30 can be defined to have an estimated tolerance, such as 105%~120% of the calculated current-limiting set value mentioned above, which enables the momentary or slight overload not to instantly initiate the protection action of the protection circuit 20, and thus, the present invention will be more flexible in performance.

The present invention can also be adaptable to the integrated detection for the current limiting of three sets of power-output levels V1 to V3 in combination with the single-set detection for the current limiting of the power-output level V1, the integrated detection for the current limiting of power-output levels V1 and V2 in combination with the integrated detection for the current limiting of power-output levels V3 and V4, or the integrated detection for the current limiting of power-output levels V1 and V2 in combination with the single-set detection for the current limiting of the power-output level V3 and the single-set detection for the current limiting of the power-output level V4. The calculation of the current-limiting detect value and the current-limiting operation are similar to those mentioned above.

Those described above are only the preferred embodiment of the present invention but not intended to limit the scope of the present invention. Any equivalent modification and variation according to the claims of the present invention is to be included within the scope of the present invention.

What is claimed is:

1. A control circuit of power supply with selectable current-limiting modes, wherein an overload/disable control circuit is electrically coupled to a power-output circuit and a protection circuit, and said control circuit comprises:

a current-limiting set unit, electrically coupled to said power-output circuit, providing a current-limiting set value and a current-limiting setting signal according to power-output levels of said power-output circuit, and obtaining a current-limiting detect value from said power-output levels of said power-output circuit to compare with said current-limiting set value in order to determine whether to output a disable/protect signal to said protection circuit; and a current-limiting switch unit, electrically coupled to said current-limiting set unit, setting up switch junctions on said power-output levels of said power-output circuit, receiving said current-limiting set signal to determine the state of said switch junctions in order to provide current-limiting detect values of single set or multiple sets of said power-output levels for said current-limiting set unit.

2. The control circuit of power supply with selectable current-limiting modes according to claim 1, wherein said current-limiting set unit has a power converter on each of said power-output levels of said power-output circuit in order to obtain said current-limiting detect values.

3. The control circuit of power supply with selectable current-limiting modes according to claim 2, wherein said power converter can be an electric resistance.

4. The control circuit of power supply with selectable current-limiting modes according to claim 2, wherein said current-limiting set unit further outputs an alert signal to an external alarm unit to indicate the heavy-load state of said power-output levels.

5. The control circuit of power supply with selectable current-limiting modes according to claim 4, wherein said alarm unit can be a LED indicator.

6. The control circuit of power supply with selectable current-limiting modes according to claim 4, wherein said alarm unit can be a buzzer.

7. The control circuit of power supply with selectable current-limiting modes according to claim 1, wherein said current-limiting set unit is an integrated circuit.

8. The control circuit of power supply with selectable current-limiting modes according to claim 1, wherein said current-limiting switch unit is a transistor.

9. The control circuit of power supply with selectable current-limiting modes according to claim 1, wherein said current-limiting set unit further outputs an alert signal to an external alarm unit to indicate the heavy-load state of said power-output levels.

10. The control circuit of power supply with selectable current-limiting modes according to claim 9, wherein said alarm unit can be a LED indicator.

11. The control circuit of power supply with selectable current-limiting modes according to claim 9, wherein said alarm unit can be a buzzer.

* * * * *